Figure 1:
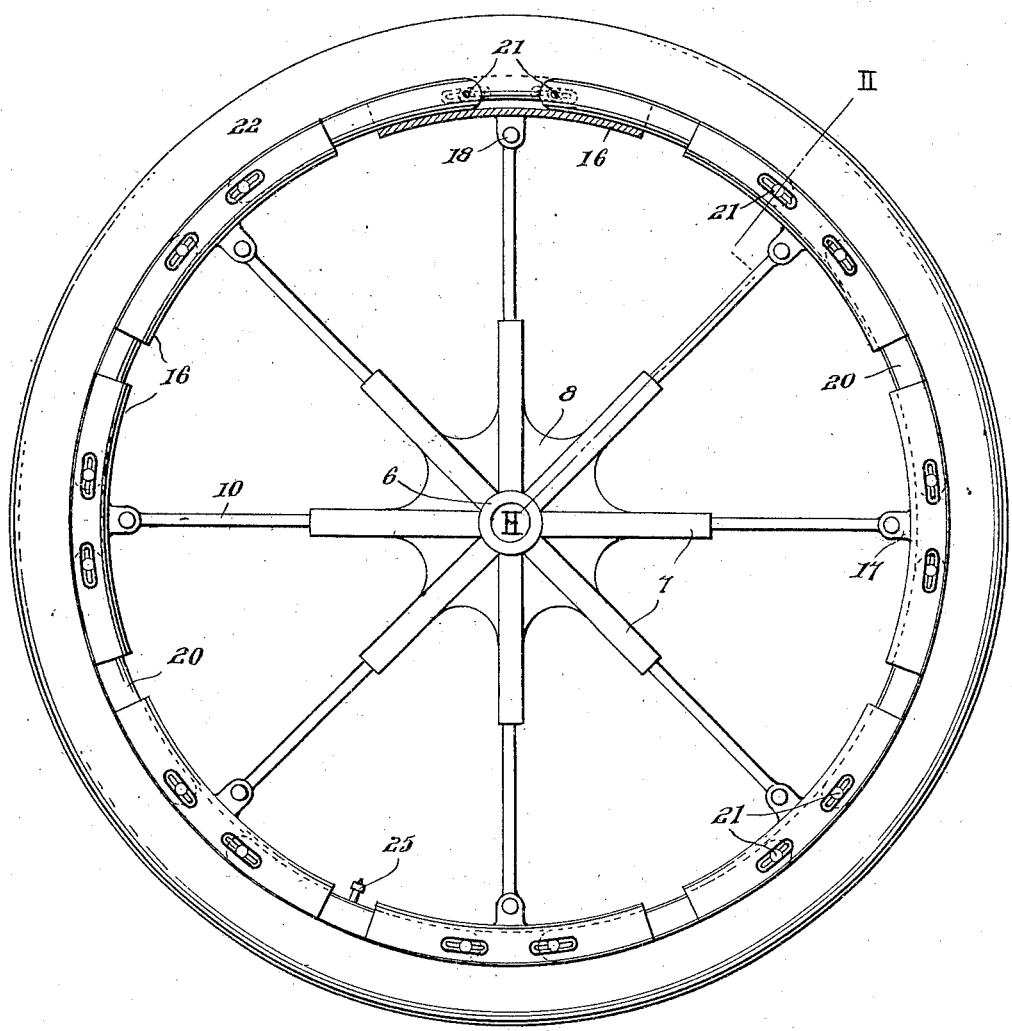

J. KOGOLSHSEK.
AUTOMOBILE WHEEL.
APPLICATION FILED AUG. 19, 1920.
1,363,129.
Patented Dec. 21, 1920.
2 SHEETS—SHEET 2.
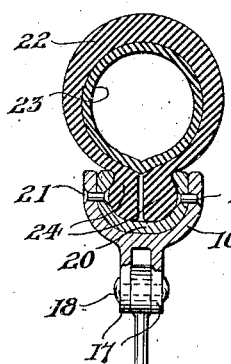
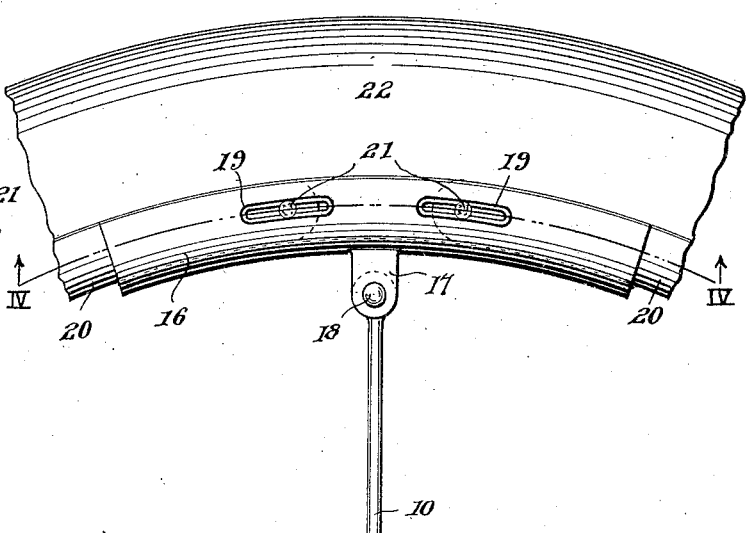
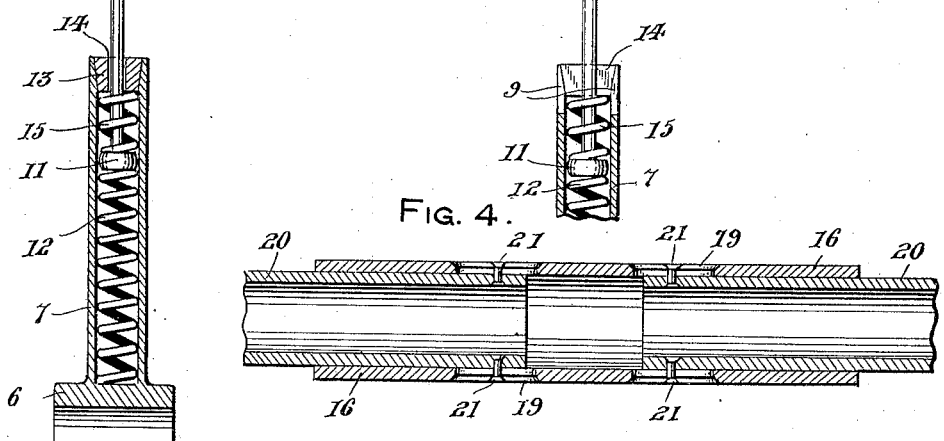
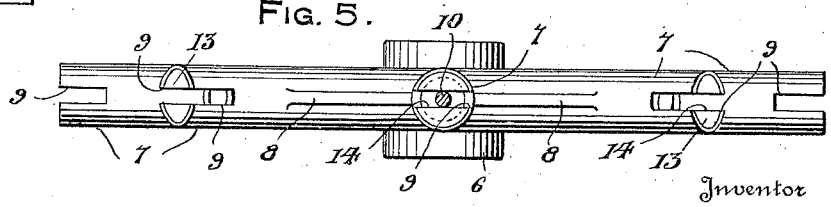
Inventor
J. Kogolshsek
By N. M. Wilson
Attorney

UNITED STATES PATENT OFFICE.

JOSEPH KOGOLSHSEK, OF KLEIN, MONTANA.

AUTOMOBILE-WHEEL.

1,363,129.  Specification of Letters Patent.  Patented Dec. 21, 1920.

Application filed August 19, 1920. Serial No. 404,516.

*To all whom it may concern:*

Be it known that I, JOSEPH KOGOLSHSEK, a citizen of Jugo-Slavia, residing at Klein, in the county of Musselshell and State of Montana, have invented certain new and useful Improvements in Automobile-Wheels, of which the following is a specification.

This invention relates to certain new and useful improvements in wheels especially constructed for use upon automobiles, the same embodying cushioned spoke members and extensible rim sections with the usual pneumatic tire supported on the rim sections.

A further object of the invention is to provide in a wheel especially adapted for automobiles, a series of resiliently mounted spokes with rim supporting shoes at the outer ends of the spokes while rim sections have their ends slidably retained within the shoes with the clencher flanges of the tire shoe secured within the sectional rim members.

With the above and other objects in view, the present invention consists in the novel form, combination and arrangement of parts hereinafter more fully described and shown in the accompanying drawings, wherein like reference characters indicate similar parts throughout the several views.

In the drawings,

Figure 1 is a side elevational view, partly in section of an automobile wheel constructed in accordance with the present invention, Fig. 2 is a cross sectional view taken on line II—II of Fig. 1 showing the resilient spoke construction with the tire supported at the outer end thereof, Fig. 3 is a side elevational view of a portion of the tire with the inner section of one spoke partially broken away and shown in section, Fig. 4 is a sectional view taken on line IV—IV of Fig. 3 showing the extensible connections between the spoke shoe and the rim sections and Fig. 5 is an edge elevational view of the inner hub structure of the wheel with the outer spoke sections and tire removed.

Referring more in detail to the accompanying drawings, and particularly to Figs. 1, 2, and 5, there is illustrated a wheel, especially designed for use upon automobiles embodying a hub section including a central bearing 6 with tubular radial sockets 7 projecting therefrom and connected adjacent the base portions thereof by web members 8. The outer ends of the tubular sockets 7 are diametrically slotted as at 9 for purposes presently to appear, the slots 9 extending in the same direction and having their axes at right angles to the major axis of the wheel hub 6.

The tubular sockets 7 constitute the inner sections of spoke members, the outer sections of which are in the form of rods 10, each extending into an adjacent socket 7 and having a head 11 engaging a coil spring 12 that is compressed by engagement at its other end with the lower end of the socket member 7 as shown in Fig. 2. In order to retain the headed end 11 of the spoke rod 10 within the tubular socket 7, the outer end of the socket is closed by a plug 13 having a transverse slot 14 that registers with the slotted sides 9 of the socket while a relatively short coil spring 15 is arranged between the head 11 and the plug 13 to cushion the rod 10 in its movement in opposite directions.

The tire rim and mounting therefor includes a shoe 16 of arcuate formation and concentric with the hub 6, the shoe being channel-shaped in cross section and carrying intermediate the ends thereof a pair of inwardly directed ears 17 between which the outer end of the rod 10 is pivotally mounted as at 18. As shown in Figs. 3 and 4, the opposite sides of the shoe 16 are provided with elongated slots 19 at opposite sides of the ears 17. Rim sections 20 of channel-shape in cross section and curved concentric with the hub 6 have meeting ends of adjacent sections slidably received within a shoe 16 while pins 21 projecting from the opposite sides of the rim sections 20 at the ends thereof freely project through the slots 19 in the shoes 16 to permit a sliding movement of the rim sections in the shoe with the pin and slot connection between the elements guiding the relative movements thereof and also limiting such movements. Any preferred type of tire may be mounted upon the rim sections 20, there being illustrated, a pneumatic tire embodying a shoe 22 having the usual inflatable inner tube 23 and base flanges 24 secured within the side walls of the channel rim sections 20 while an inflating valve 25 shown in Fig. 1 extends through a rim section and communicates with the tube 23.

From the above detailed description of the invention, it is believed that the construction and operation thereof will at once be apparent, it being noted that the spoke rod sections 10 are resiliently mounted within the tubular sockets 7 and are cushioned in their movements in opposite directions. Circumferential strains received upon the wheel tread are compensated by the capability of a slight circumferential movement of the spoke sections 10 relative to the sockets 7, afforded by the slotted walls 9 in the tubular sockets 7 and the slots 14 in the socket plugs 13, the pivotal connection 18 between the outer sections of the spokes and the spoke shoes while the extensible sliding connections between the spoke shoes and the rim sections will cause the majority of shocks and jars to be absorbed by the wheel, due to the deforming of the tire tread.

While there is herein shown and described the preferred embodiment of the invention, it is nevertheless to be understood that minor changes may be made therein without departing from the spirit and scope of the invention as hereinafter claimed.

What is claimed as new is:

1. A cushion wheel of the type described comprising a hub section, tubular sockets carried thereby, spoke rods slidable within said sockets, cushion springs within said sockets for resiliently supporting said rods, arcuate shoes pivotally mounted upon the outer ends of the rods, rim sections slidably associated with said shoes and a tire supported on the rim sections.

2. A cushion wheel of the type described comprising a hub section, tubular sockets carried thereby, spoke rods slidable within said sockets, cushion springs within said sockets for resiliently supporting said rods, arcuate shoes pivotally mounted upon the outer ends of the rods, rim sections slidably associated with said shoes, a tire supported on the rim sections and pin and slot connections between the spoke shoes and rim sections.

3. A cushion wheel of the type described comprising a hub section, tubular sockets carried thereby, spoke rods slidable within said sockets, cushion springs within said sockets for resiliently supporting said rods, arcuate shoes pivotally mounted upon the outer ends of the rods, rim sections slidably associated with said shoes, a tire supported on the rim sections, the spoke shoes and rim sections being coöperatively constructed to permit a sliding limited movement between the shoes and rim sections.

4. A cushion wheel of the type described comprising a hub section, tubular sockets carried thereby, spoke rods slidable within said sockets, cushion springs within said sockets for resiliently supporting said rods, arcuate shoes pivotally mounted upon the outer ends of the rods, rim sections slidably associated with said shoes, a tire supported on the rim sections, the outer ends of the tubular sockets being slotted to permit a circumferential movement of the spoke rods relative to the tubular sockets.

In testimony whereof I affix my signature.

JOSEPH KOGOLSHSEK